United States Patent
Choi et al.

(10) Patent No.: US 8,708,617 B2
(45) Date of Patent: Apr. 29, 2014

(54) INTERNAL GROOVE INSERT AND TOOL HOLDER THEREFOR

(75) Inventors: Chang Hee Choi, Daegu (KR); Hong Sik Park, Daegu (KR); Sung Hyup Park, Daegu (KR)

(73) Assignee: TaeguTec, Ltd., Dalseong-gun, Daegu (KR)

( * ) Notice: Subject to any disclaimer, the term of this patent is extended or adjusted under 35 U.S.C. 154(b) by 41 days.

(21) Appl. No.: 13/520,723

(22) PCT Filed: Feb. 9, 2010

(86) PCT No.: PCT/KR2010/000787
§ 371 (c)(1),
(2), (4) Date: Jul. 5, 2012

(87) PCT Pub. No.: WO2011/083887
PCT Pub. Date: Jul. 14, 2011

(65) Prior Publication Data
US 2012/0282047 A1    Nov. 8, 2012

(30) Foreign Application Priority Data
Jan. 6, 2010  (KR) .................. 10-2010-0000774

(51) Int. Cl.
*B23B 27/16*  (2006.01)
*B23C 5/20*   (2006.01)

(52) U.S. Cl.
USPC ......................................... 407/114; 407/103

(58) Field of Classification Search
USPC ............ 407/103, 113, 114, 115, 116, 117, 23
See application file for complete search history.

(56) References Cited

U.S. PATENT DOCUMENTS

| | | | | |
|---|---|---|---|---|
| 3,226,797 A | * | 1/1966 | Hertel | 407/101 |
| 3,902,232 A | * | 9/1975 | Hertel | 407/104 |
| 4,607,988 A | * | 8/1986 | Salm et al. | 407/114 |
| 5,957,629 A |   | 9/1999 | Hessman et al. | |
| 6,053,672 A | * | 4/2000 | Satran et al. | 407/40 |

(Continued)

FOREIGN PATENT DOCUMENTS

| | | |
|---|---|---|
| CN | 1803414 A | 7/2006 |
| CN | 2868602 Y | 2/2007 |

(Continued)

OTHER PUBLICATIONS

Written Opinion in PCT/KR2010/000787, dated Feb. 24. 2011.

(Continued)

*Primary Examiner* — Will Fridie, Jr.
(74) *Attorney, Agent, or Firm* — Womble Carlyle

(57) ABSTRACT

An internal groove insert includes a rectangular main body having a top surface, a lower surface, and first to fourth lateral surfaces; and first and second projections each projecting from the adjacent first and second lateral surfaces. The first projection has a first cutting edge at the side of the top surface of the main body, while the second projection has a second cutting edge at the side of the lower surface. The first and fourth lateral surfaces are inclined by an obtuse angle with respect to the top surface, while the second and third lateral surfaces are inclined by an acute angle with respect to the top surface. The central axis of the clamping hole is inclined to be parallel to the insert corner edge where the first and fourth lateral surfaces meet.

8 Claims, 4 Drawing Sheets

(56) References Cited

U.S. PATENT DOCUMENTS

| | | | |
|---|---|---|---|
| 6,527,485 B1 * | 3/2003 | Little | 407/24 |
| 6,612,207 B2 * | 9/2003 | Schiffers | 82/1.11 |
| 6,733,215 B2 | 5/2004 | Isaksson | |
| 6,929,428 B1 * | 8/2005 | Wermeister et al. | 407/113 |
| 7,001,115 B2 * | 2/2006 | Erickson et al. | 407/113 |
| 7,013,783 B2 | 3/2006 | Matsuoka | |
| 7,270,503 B2 * | 9/2007 | Berger et al. | 408/199 |
| 7,381,015 B2 | 6/2008 | Jonsson | |
| 7,597,508 B2 * | 10/2009 | Hecht | 407/101 |
| RE41,275 E * | 4/2010 | Tsuda et al. | 407/107 |

FOREIGN PATENT DOCUMENTS

| | | |
|---|---|---|
| DE | 2 250 925 | 10/1972 |
| DE | 3204999 A1 | 8/1983 |
| EP | 0983815 A2 | 8/2000 |
| JP | 11-000813 A | 1/1999 |
| JP | 2003-211306 A | 7/2003 |
| JP | 2005-177836 A | 7/2005 |
| JP | 2006-062070 | 3/2006 |
| JP | 2007-118137 A | 5/2007 |
| JP | 2007-268694 | 10/2007 |
| JP | 2009-142833 A | 7/2009 |
| SU | 867285 A3 | 9/1981 |
| WO | WO 97/22429 A1 | 6/1997 |

OTHER PUBLICATIONS

Notice of Allowance dated Aug. 30, 2013 issued in Japanese counterpart application (No. 2012-545827).
International Search Report in PCT/KR2010/000787, dated Feb. 24, 2011.
Wirtten Opinion in PCT/KR2010/000787, dated Feb. 24, 2011.
Official Action dated Dec. 4, 2013 issued in Chinese counterpart application (No. 201080060815.9) with translation.

* cited by examiner

INTERNAL GROOVE INSERT AND TOOL HOLDER THEREFOR

RELATED APPLICATIONS

This is a 35 USC 371 U.S. National Phase of International Application No. PCT/KR2010/000787 filed 09 Feb. 2010 and published in English as WO 2011/083887A1 on 14 Jul. 2011, which claims priority to KR 10-2010-0000774, filed 06 Jan. 2010. The contents of the aforementioned applications are incorporated by reference in their entirety.

TECHNICAL FIELD

The present invention relates to an internal groove insert for forming a groove inside a bore of a workpiece and a tool holder for mounting the same.

BACKGROUND ART

As shown in FIG. 8, a conventional internal groove insert, which is mounted to a tool holder, is used to form a groove inside a bore of a workpiece. As further shown in FIG. 8, the conventional internal groove insert 100 includes a main body 110 and two projections 121, 122 that project from two adjacent lateral surfaces of the main body 110. Thus, the insert 100 generally has an L-shape. Cutting edges 124, 126 for performing a cutting operation are formed at the end portions of the two projections 121, 122. The insert 100 having such a shape is mounted within a pocket formed at the end portion of a tool holder 130, wherein the pocket has a shape corresponding to the insert 100 so that it can accommodate the insert 100 therein. That is, the pocket is provided with a recess 132, which corresponds to and receives one of the projections of the insert 100. As the tool holder 130 in which the insert 100 is mounted rotates about a rotation axis 134, the cutting edge 124 projecting outwardly from the peripheral surface of the tool holder 130 cuts the interior surface of the bore of the workpiece 136 such that a groove can be formed.

FIG. 9 shows a conventional indexable cutting insert 200, which is capable of both turning and drilling. As shown in FIG. 9, the cutting insert 200 includes a top surface 201, a lower surface 202 and four lateral surfaces 203 extending between the top surface 201 and the lower surface 202 so that the insert 200 has a generally rectangular shape. The lateral surface 203 of the cutting insert 200 is configured to be inclined by an obtuse angle with respect to the lower surface 202 so as to define a positive clearance angle. As such, when performing turning and drilling operations, it can avoid an interference with a workpiece. FIG. 10 is a side view of the end portion of a tool holder having the cutting insert of FIG. 9. As shown in FIG. 10, a lateral wall 212 of a pocket of the tool holder 210, in which the insert 200 is mounted, is inclined by an obtuse angle with respect to the bottom surface 214 of the pocket. The obtuse angle between the lateral wall 212 and the bottom surface 214 is same as the angle α between the lateral surface 203 and the lower surface 202 of the cutting insert 200.

As such, the internal groove insert and the indexable cutting insert for turning and drilling have different shapes since their operating conditions differ. Further, a pocket of a tool holder is configured to have a shape, which may receive its corresponding insert. Thus, the conventional technique has a problem in that the tool holder for the conventional indexable cutting insert for turning and drilling cannot be used for an internal groove insert. Moreover, a separate tool holder, which is different from the tool holder of the conventional indexable insert for turning and drilling, is required for the internal groove insert.

SUMMARY

The present invention is directed to solving such a problem of the conventional technique. The object of the present invention is to provide an internal groove insert that can be used in a tool holder, which is also compatible with a cutting insert for turning and drilling. Another object of the present invention is to provide a tool holder, which can be used for both the internal groove insert of the present invention and the conventional cutting insert for turning and drilling.

Further, another object of the present invention is to provide an internal groove insert, which can minimize a stress imparted to the clamping screw for mounting the insert, and which can be easily manufactured without using any difficult manufacturing technique.

To achieve these objects, an internal groove insert according to one embodiment of the present invention comprises: a rectangular main body comprising a top surface, a lower surface, first to fourth lateral surfaces which are formed in counter-clockwise order from the top view and a clamping hole passing from the center of the top surface to the center of the lower surface; and first and second projections each projecting from the adjacent first and second lateral surfaces. The first projection has a first cutting edge thereon at the side of the top surface of the main body and the second projection has a second cutting edge thereon at the side of the lower surface of the main body. The first and fourth lateral surfaces are inclined by an obtuse angle with respect to the top surface of the main body, while the second and third lateral surfaces are inclined by an acute angle with respect to the top surface of the main body. The central axis of the clamping hole is inclined so that the axis is parallel to the edge where the first and fourth lateral surfaces meet. The first projection has chip breakers thereon at the side of the top surface of the main body, while the second projection has chip breakers on its surface at the side of the lower surface of the main body. This insert is formed by an inclined pressing molding.

A tool holder according to one embodiment of the present invention comprises a pocket, which can receive the internal groove insert of the present invention. The pocket comprises a bottom surface, as well as first and second lateral walls that are adjacent to each other and inclined by an obtuse angle with respect to the bottom surface. The obtuse angle, which the first and second lateral walls of the pocket form with respect to the bottom surface of the pocket, is the same as the obtuse angle that the first and fourth lateral surfaces of the insert form with respect to the top surface of the insert. A recess for receiving one of the projections of the internal groove insert is formed on the first lateral wall. A screw hole, into which a clamping screw for mounting the insert is fastened, is formed on the bottom surface of the pocket. The central axis of the screw hole is formed to be parallel to the edge where the first and second lateral walls of the pocket meet.

According to the present invention, the internal groove insert can be used in a tool holder, which is also compatible with a cutting insert for turning and drilling. The tool holder of the present invention, which has the pocket for receiving the internal groove insert of the present invention, can also receive the cutting insert for turning and drilling. Thus, it is not necessary to separately use two types of tool holders for the internal groove insert and the cutting insert for turning and drilling.

Further, the internal groove insert of the present invention can minimize the stress imparted to the clamping screw for mounting the insert. The internal groove insert can be easily manufactured without using any difficult manufacturing technique.

DETAILED DESCRIPTION

Referring to the embodiments illustrated in drawings, an internal groove insert according to the present invention and a tool holder in which such an insert is mounted are described below.

Figure 1:
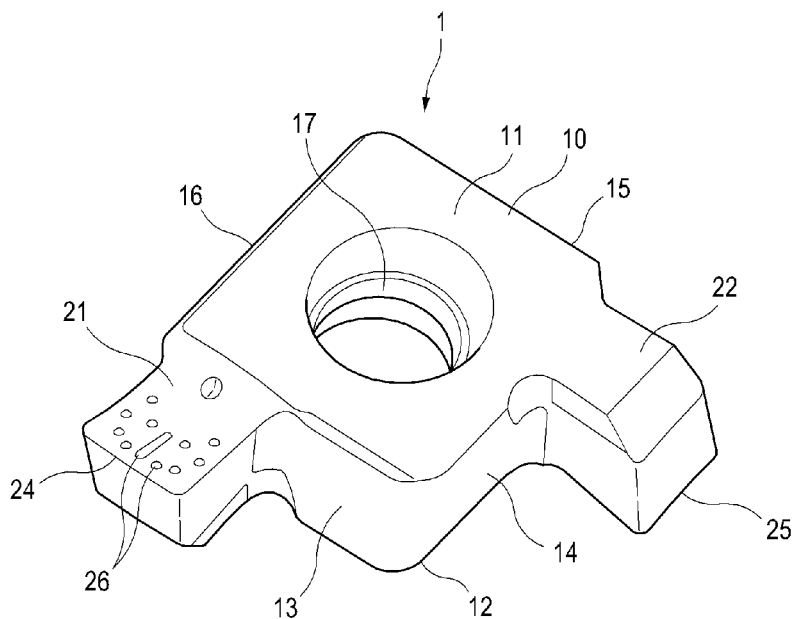
FIG. 1 is a perspective view of the internal groove insert according to the present invention.
Figure 2:
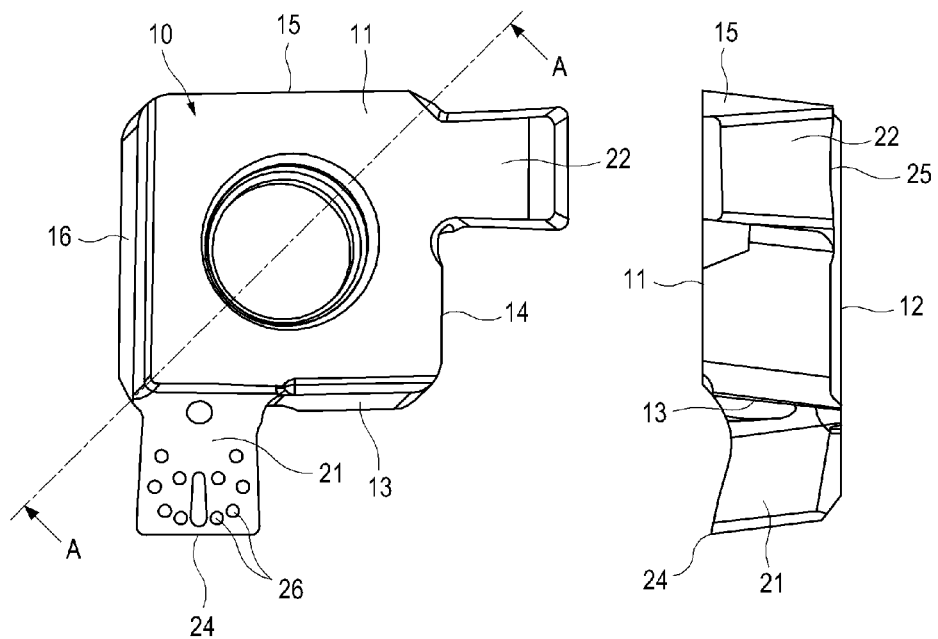
FIG. 2 is a top view and a side view of the insert shown in FIG. 1.

FIG. 1 is a perspective view of an internal groove insert according to the present invention. FIG. 2 shows a top view (left side) and a side view (right side) of the internal groove insert shown in FIG. 1. As illustrated in FIGS. 1 and 2, the insert comprises a rectangular main body 10. The main body 10 includes a top surface 11, a lower surface 12, first to fourth lateral surfaces 13-16 extending between the top surface 11 and the lower surface 12 and a clamping hole 17 which passes through from a center of the top surface 11 to a center of the lower surface 12. The first to fourth lateral surfaces 13-16 are orderly formed in the counter-clockwise direction when seen from the top surface 11 of the main body 10. A first projection 21 and a second projection 22 project from the adjacent first and second lateral surfaces 13, 14, respectively.

Figure 3:
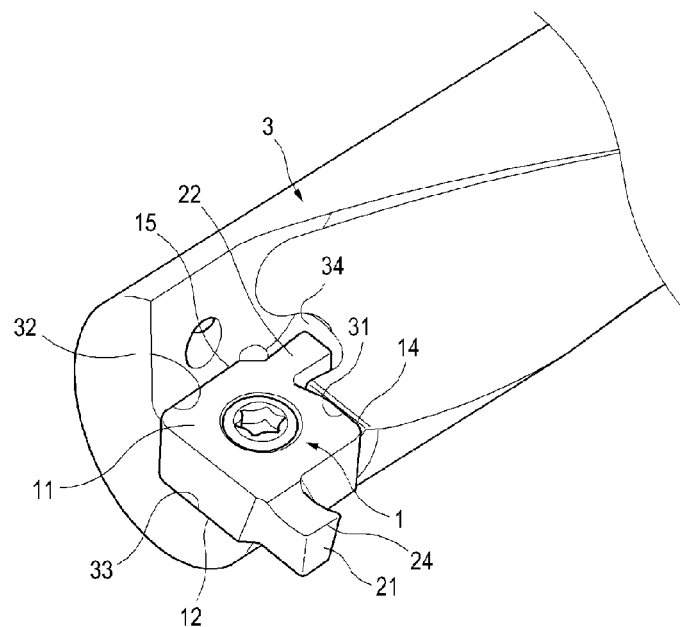
FIG. 3 shows that the insert of FIG. 1 is mounted on the tool holder.

The first projection 21 has a first cutting edge 24 on its end portion at the side of the top surface 11 of the main body 10. The second projection 22 has a second cutting edge 25 on its end portion at the side of the lower surface 12 of the main body 10. As illustrated in FIG. 3, when the lower surface 12 of the insert is mounted in contact with a bottom surface 33 of a pocket of a tool holder 3, the first cutting edge 24 is used for internal grooving operation. On the contrary, when the top surface 11 of the insert is mounted in contact with the bottom surface 33 of the pocket of the tool holder 3, the second cutting edge 25 is used for internal grooving operation. As such, two cutting edges 24, 25 are formed in opposite directions to each other. Thus, a cutting edge, which is not involved in the cutting operation, is prevented from being damaged by cutting chips generated during the cutting operation. In particular, when the first cutting edge 24 is in use for the cutting operation, the second cutting edge 25 is prevented from being damaged by the cutting chips generated during the cutting operation. Further, when the second cutting edge 25 is in use for the cutting operation, the first cutting edge 24 is prevented from being damaged by the cutting chips.

As illustrated in FIG. 2, the first projection 21 has chip breakers 26 at the side of the top surface 11 of the main body 10 in order to facilitate the discharge of chips generated from the cutting edge 24 during the cutting operation. Although it is not illustrated, the second projection 22 also has chip breakers at the side of the lower surface 12 of the main body 10. The first to fourth lateral surfaces 13-16 of the insert 1 are inclined with respect to the top and lower surfaces 11, 12. As illustrated in FIG. 2, the first lateral surface 13 is inclined by an obtuse angle with respect to the top surface 11 of the main body 10, while the third lateral surface 15 is inclined by an acute angle with respect to the top surface 11 of the main body. The fourth lateral surface 16 is inclined by an obtuse angle with respect to the top surface 11 of the main body 10, while the second lateral surface 14 is inclined by an acute angle with respect to the top surface 11 of the main body.

Figure 5:
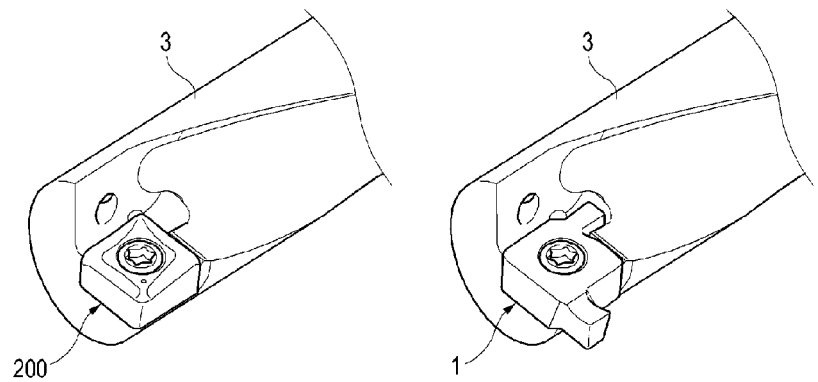
FIG. 5 shows that the cutting insert for turning and drilling and the internal groove insert shown FIG. 1 are mounted in identical tool holders.

FIG. 3 shows that the internal groove insert of FIG. 1 is mounted in a tool holder. The insert 1 is mounted within the pocket of the tool holder 3. An inner side of the pocket has a shape corresponding to an outer shape of the insert 1. The pocket of the tool holder 3 comprises a bottom surface 33 and first and second lateral walls 31, 32, which are adjacent to each other and inclined by an obtuse angle with respect to the bottom surface 33. The obtuse angle defined between the first and second lateral walls 31, 32 and the bottom surface 33 is the same as the obtuse angle defined between the first and fourth lateral surfaces 13, 16 and the top surface 11 of the insert 1. A recess 34 is formed in the first lateral wall 31 for receiving the projection of the insert 1. In FIG. 3, the lower surface 12 of the insert 1 is in contact with the bottom surface 33 of the pocket, while the second and third lateral surfaces 14, 15 abut the first and second lateral walls 31, 32, respectively. The second projection 22 of the insert 1 is received within the recess 34 of the pocket. As such, since the first and fourth lateral surfaces 13, 16 of the insert 1 are inclined to define an obtuse angle with respect to the top surface 11 of the main body 10 while the second and third lateral surfaces 14, 15 are inclined to define an acute angle with respect to the top surface 11 of the main body 10, the first and second lateral walls 31, 32 of the pocket of the tool holder 3 are inclined to define an obtuse angle with respect to the bottom surface 33, thereby corresponding to the shape of the insert 1. Thus, as illustrated in FIG. 5, the pocket of the tool holder in which the insert 1 is received can also receive the indexable insert 200 for the turning and drilling operations whose lateral surfaces 202 are inclined by an obtuse angle with respect to the lower surface 201.

Figure 4:
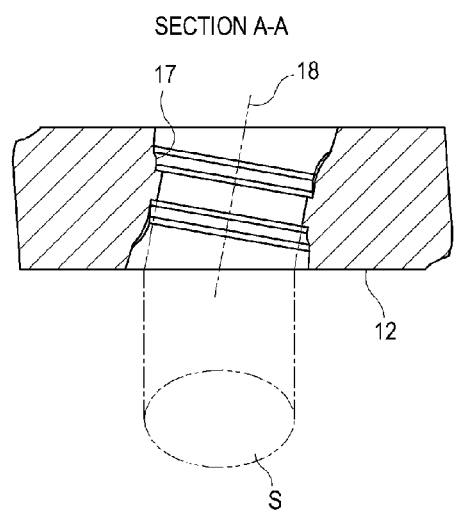
FIG. 4 is a sectional view of the insert taken along the line A-A shown in FIG. 2.

FIG. 4 is a sectional view taken along line A-A of FIG. 2. As illustrated in FIG. 4, a first central axis 18 of the clamping hole 17 is inclined with respect to the lower surface 12 of the main body 10. The inclined angle of the first central axis 18 is same as the inclined angle of the edge with respect to the lower surface 12, the edge being defined by an intersection of the first lateral surface 13 and the fourth lateral surface 16. That is, the first central axis 18 is parallel to the insert corner edge where the first and fourth lateral surfaces 13, 16 intersect. Corresponding to this, a screw hole (not illustrated), in which a clamping screw is fastened, is defined on the bottom surface 33 of the tool holder 3. The second central axis of the screw hole is inclined with respect to the bottom surface 33 by the same angle as the first central axis 18 of the clamping hole 17. That is, the second central axis of the screw hole is parallel to a pocket corner edge where the first and second lateral walls 31, 32 of the pocket meet.

As such, since the clamping hole 17, into which the clamping screw is inserted, is inclined with respect to the top and lower surfaces 11, 12 of the insert 1, the clamping screw is fastened to be inclined with respect to the bottom surface 33 of the pocket of the tool holder 3. Thus, a cross-sectional area (S in FIG. 4) of the clamping screw in the abutting surface is larger compared to the case where a clamping screw is perpendicularly fastened into a bottom surface. Thus, stress imparted to the clamping screw is reduced and the insert can be fastened more securely.

Further, since the clamping hole 17 is inclined with respect to the edge where the first and fourth lateral surfaces 13, 16 meet, the insert 1 can be easily manufactured by an inclined pressing molding method without using any difficult manufacturing technique. A method of manufacturing the insert according to the present invention by the inclined pressing molding method is explained below.

The insert 1 according to the present invention includes the first to fourth lateral surfaces 13-16, which are inclined with respect to the top and lower surfaces 11, 12. When the top and lower surfaces of the insert art not perpendicular to the lateral surfaces of the insert, a die whose bottom surface and lateral surfaces are not perpendicular to each other (so-called positive die) is used. However, such a positive die requires a difficult pressing technique since the bottom surface and the lateral surfaces of the die are inclined with respect to each other.

Figure 6:
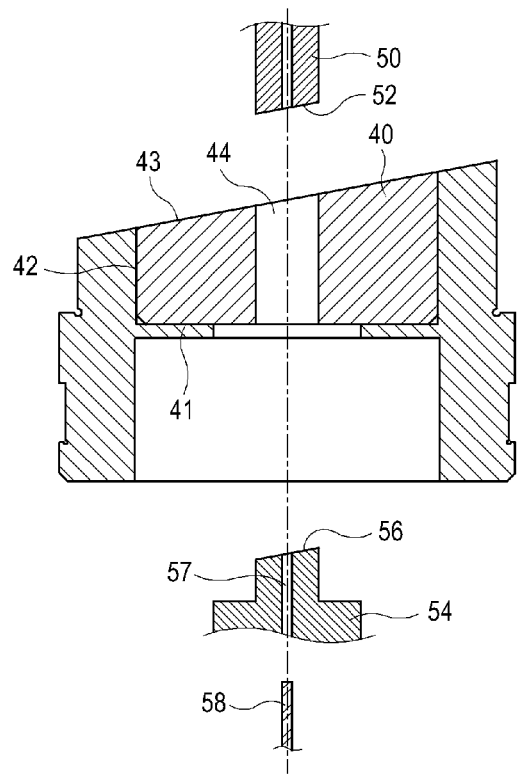
FIG. 6 is a sectional view of an apparatus for manufacturing the insert shown in FIG. 1.
Figure 7:
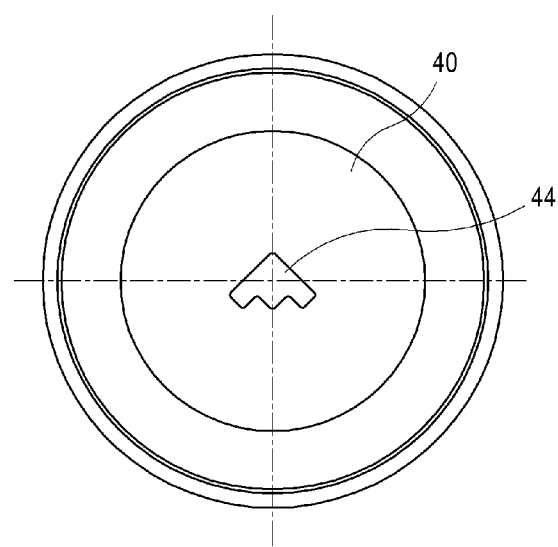
FIG. 7 is a top view of the apparatus shown in FIG. 6.
Figure 8:
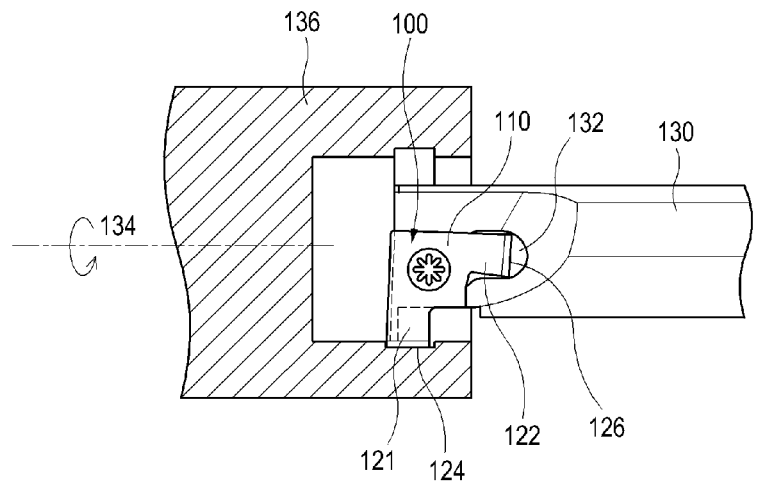
FIG. 8 shows a conventional internal groove insert.
Figure 9:
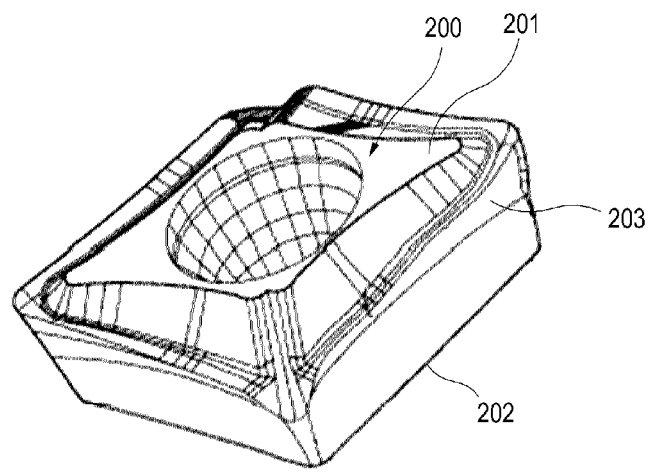
FIG. 9 shows a cutting insert, which is capable of both turning and drilling.
Figure 10:
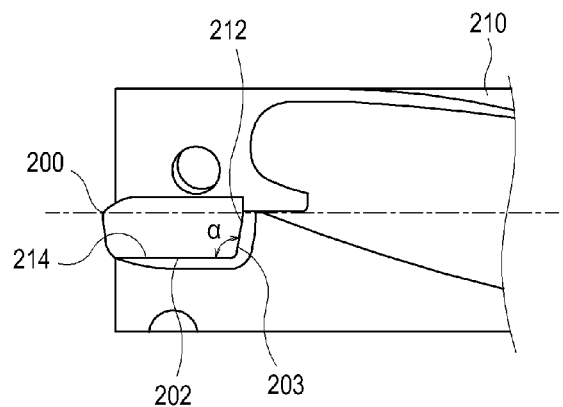
FIG. 10 shows that the cutting insert of FIG. 9 is mounted in a tool holder.

FIG. 6 is a sectional view of an inclined die used for an inclined pressing molding method. As illustrated in FIG. 6, the inclined die 40 includes a bottom surface 41, lateral surfaces 42 which are perpendicular to the bottom surface 41, a top surface 43 which is inclined with respect to the lateral surfaces 42 and a through hole 44 which passes through from the top surface 43 of the inclined die 40 to the bottom surface 41 of the inclined die 40 and is perpendicular to the bottom surface 41. As illustrated in FIG. 7, the through hole 44 has an L-shaped section as the shape of the insert 1 when seen, from the top view. A process of manufacturing the insert by the inclined pressing molding method is as follows: a lower punch 54 and a core rod 58 rise from the space under the through hole 44 of the inclined die 40; metal powder for forming the insert is poured; and an upper punch 50 is inserted from the space over the through hole 44 of the inclined die 40. An outer shape of the insert 1 is formed by the space defined by the inner surfaces of the through hole 44 of the inclined die 40, a pressing surface 52 of the upper punch 50 and a pressing surface 56 of the lower punch 54. The clamping hole 17 is formed by the core rod 58. After the metal powder is compressed and sintered, it is ground to form the complete insert. According to the present invention, since the clamping hole 17 is inclined to be parallel to an edge where the first and fourth lateral surfaces 13, 16 meet, it can be formed by the core rod 58 which is perpendicular to the bottom surface 41 of the inclined die 40. Thus, it is not necessary to use a positive die, which requires a difficult pressing technique. As such, productivity can be greatly improved through manufacturing the insert by the inclined pressing molding.

The invention claimed is:

1. An internal groove insert, comprising:
a rectangular main body having a top surface, a lower surface, first, second, third and fourth lateral surfaces formed in a counter-clockwise direction when seen from a top view;
a clamping hole passing from said top surface to said lower surface, the clamping hole having a first central axis; and
first and second projections each projecting from adjacent first and second lateral surfaces, respectively; wherein said first projection has a first cutting edge on its end portion at a side of the top surface of the main body, and said second projection has a second cutting edge on its end portion at a side of the lower surface of the main body; wherein
said first and fourth lateral surfaces are inclined by an obtuse angle with respect to the top surface of the main body,
said second and third lateral surfaces being inclined by an acute angle with respect to the top surface of the main body; and wherein
the first central axis of said clamping hole is formed to be parallel to an insert corner edge where the first and fourth lateral surfaces meet.

2. The internal groove insert of claim 1,
wherein said first projection has chip breakers on its surface at the side of the top surface of said main body, and
wherein said second projection has chip breakers on its surface at the side of the lower surface of said main body.

3. The internal groove insert of claim 1, wherein said insert is formed by an inclined pressing molding.

4. A tool holder comprising a pocket in which the internal groove insert of claim 1 is mounted, wherein:
said pocket comprises a bottom surface and first and second lateral walls adjacent to each other and being inclined by an obtuse angle with respect to said bottom surface;
the obtuse angle formed by said first and second lateral walls with respect to said bottom surface is identical to the obtuse angle formed by said first and fourth lateral surfaces of said insert with respect to the top surface of the main body; and
a recess for receiving one of the projections of said insert is formed on said first lateral wall.

5. The tool holder of claim 4, wherein:
the bottom surface has a screw hole into which a clamping screw for mounting said insert is fastened, the screw hole having a second central axis;
the first and second lateral walls define a pocket corner edge; and
the second central axis of said screw hole is formed to be parallel to the pocket corner edge.

6. A tool holder comprising a pocket in which the internal groove insert of claim 2 is mounted, wherein:
said pocket comprises a bottom surface and first and second lateral walls adjacent to each other and being inclined by an obtuse angle with respect to said bottom surface;
the obtuse angle formed by said first and second lateral walls with respect to said bottom surface is identical to the obtuse angle formed by said first and fourth lateral surfaces of said insert with respect to the top surface of the main body; and
a recess for receiving one of the projections of said insert is formed on said first lateral wall.

7. The tool holder of claim 6, wherein:
the bottom surface has a screw hole into which a clamping screw for mounting said insert is fastened, the screw hole having a second central axis;
the first and second lateral walls define a pocket corner edge; and
the second central axis of said screw hole is formed to be parallel to the pocket corner edge.

8. The internal groove insert of claim 2, wherein said insert is formed by an inclined pressing molding.

* * * * *